United States Patent
Mather

(10) Patent No.: US 10,040,909 B2
(45) Date of Patent: Aug. 7, 2018

(54) REVERSIBLE SHAPE MEMORY POLYMERS EXHIBITING AMBIENT ACTUATION TRIGGERING

(71) Applicant: Patrick T. Mather, Oxford, PA (US)

(72) Inventor: Patrick T. Mather, Oxford, PA (US)

(73) Assignee: Syracuse University, Syracuse, NY (US)

( * ) Notice: Subject to any disclaimer, the term of this patent is extended or adjusted under 35 U.S.C. 154(b) by 71 days.

(21) Appl. No.: 14/441,677

(22) PCT Filed: Nov. 2, 2013

(86) PCT No.: PCT/US2013/068182
§ 371 (c)(1),
(2) Date: May 8, 2015

(87) PCT Pub. No.: WO2014/071267
PCT Pub. Date: May 8, 2014

(65) Prior Publication Data
US 2016/0017101 A1    Jan. 21, 2016

Related U.S. Application Data

(60) Provisional application No. 61/722,098, filed on Nov. 2, 2012.

(51) Int. Cl.
| | | |
|---|---|---|
| *C08G 81/00* | (2006.01) | |
| *C08L 53/00* | (2006.01) | |
| *C08L 101/12* | (2006.01) | |
| *C08G 81/02* | (2006.01) | |

(52) U.S. Cl.
CPC ............ *C08G 81/00* (2013.01); *C08G 81/021* (2013.01); *C08G 81/024* (2013.01); *C08G 81/027* (2013.01); *C08G 81/028* (2013.01); *C08L 53/00* (2013.01); *C08L 101/12* (2013.01); *C08L 2201/12* (2013.01)

(58) Field of Classification Search
CPC .. C08G 81/021; C08G 81/024; C08G 81/027; C08G 81/00; C08G 81/028; C08L 53/00; C08L 101/12; C08L 2201/12
See application file for complete search history.

(56) References Cited

U.S. PATENT DOCUMENTS

| | | | | |
|---|---|---|---|---|
| 5,189,110 A | * | 2/1993 | Ikematu | C08F 297/04 264/230 |
| 6,720,402 B2 | | 4/2004 | Langer et al. | |
| 2003/0055198 A1 | * | 3/2003 | Langer | B29C 61/003 528/80 |
| 2004/0015187 A1 | * | 1/2004 | Lendlein | A61B 17/06166 606/228 |
| 2004/0116641 A1 | * | 6/2004 | Mather | A61F 2/88 528/28 |
| 2004/0193257 A1 | | 9/2004 | Wu et al. | |
| 2005/0202194 A1 | | 9/2005 | Browne et al. | |
| 2007/0275020 A1 | | 11/2007 | Lendlein et al. | |
| 2009/0092807 A1 | | 4/2009 | Hu et al. | |

FOREIGN PATENT DOCUMENTS

| | | |
|---|---|---|
| WO | 03088818 | 10/2003 |
| WO | 2004033515 | 4/2004 |

OTHER PUBLICATIONS

Chung, T. et al., "Two-Way Reversible Shape Memory in a Semicrystalline Network", Macromolecules, 2008, vol. 41, pp. 184-192, See abstract; pp. 186-187; and Figure 4.
International Preliminary Report on Patentability Form PCT/IB/373, International Application No. PCT/US2013/068182, pp. 1-6, dated May 5, 2015.
Yang, et al., "Multilength Scale Studies of Confined Crystallization in Poly (L-lactide)-block-Poly(ethylene glycol) Copolymer", Macromolecules, vol. 45, No. 10, May 22, 2012, ACS Publications, pp. 4254-4261.
Castillo, et al., "Fractionated Crystallization and Fractionated Melting of Confined PEO Microdomains in PB-b-PEO and PE-b-PEO Diblock Copolymers" Macromolecules, vol. 41, No. 3, Feb. 1, 2008, American Chemical Society, pp. 879-889.
Matsumoto, et al., "Shape-memory properties of electrospun non-woven fabrics prepared from degradable polyesterurethanes containing poly ([omega]-pentadecalactone) hard segments", European Polymer Journal, vol. 48, No. 11, pp. 1866-1874.
Kratz, et al., "Shape-memory properties and degradation behavior of multifunctional electro-spun scaffolds", International Journal of artificial Organs, vol. 34, No. 2, Mar. 1, 2011, pp. 225-230.
EP Search Report for Application 13 850 360.2-1377 dated Feb. 28, 2017.

* cited by examiner

*Primary Examiner* — Jeffrey C Mullis
(74) *Attorney, Agent, or Firm* — Bond Schoeneck & King, PLLC; David Nocilly; George McGuire

(57) ABSTRACT

Shape memory polymers featuring reversible actuation capability under ambient stimulus for integration with apparel. One approach is to use a multiblock polymer consisting of two (or potentially more) blocks in which the one block is the crystalline switching block with relatively low melting transitions, the other block has a higher thermal transition, and the two blocks are linked together by a linker molecule. Another approach is to use a graft copolymer having high and low melting transitions where the graft copolymer has a first polymer serving as the backbone and a second polymer being grafted to or from the backbone at certain graft locations. A further approach is to use latent crosslinking of a semicrystalline polymer with reactive groups placed on the backbone.

11 Claims, 1 Drawing Sheet

REVERSIBLE SHAPE MEMORY POLYMERS EXHIBITING AMBIENT ACTUATION TRIGGERING

CROSS-REFERENCE TO RELATED APPLICATIONS

The present application claims priority to U.S. Provisional Application No. 61/722,098, filed on Nov. 2, 2012.

BACKGROUND OF THE INVENTION

1. Field of the Invention

The present invention relates to shape memory polymers and, more particularly, to shape memory polymers featuring reversible actuation capability under ambient stimulus for integration with apparel.

2. Description of the Related Art

Shape memory materials are those materials that have the ability to "memorize" a macroscopic (permanent) shape, be manipulated and "fixed" to a temporary and dormant shape under specific conditions of temperature and stress, and then later relax to the original, stress-free, condition under thermal, electrical, or environmental command This relaxation is associated with elastic deformation stored during prior manipulation. Shape memory materials have aroused great attention by scientists and engineers due to their capacity to remember two shapes at different conditions.

The most prominent and widely used shape memory materials currently are shape memory alloys (SMAs). Their shape memory effect comes from the existence of two stable crystal structures: the high temperature-favored austenitic phase and low temperature-favored (and "yield-able") martensitic phase. Downsides that limit their application include limited recoverable strains less than 8%, inherently high stiffness, high cost, comparatively inflexible transition temperature, and demanding processing and training conditions. Such limitations have provided motivation for the development of alternative materials, especially polymeric shape memory materials. Polymeric materials are intrinsically capable of a shape memory effect, although the mechanisms responsible differ dramatically from those of metal alloys. In SMAs, pseudoplastic fixing is possible through the martensitic de-twinning mechanism, while recovery is triggered by the martensite-austenite phase transition. In contrast, shape memory polymers achieve temporary strain fixing and recovery through a variety of physical means, while the underlying extensibility is derived from the intrinsic elasticity of polymeric networks.

The shape memory effect in polymers can take two quite distinct forms: one-way or two-way shape memory. In the one-way shape memory case, the cycle is started at low stress and high temperature, at which point the stress ramped to deform the sample, and following which steps of cooling under load and then unloading at low temperature reveal the quality of shape "fixing". Finally, reheating the sample to the original temperature leads to strain recovery. In contrast, two-way shape memory features reversible actuation at a single applied stress. The two-way shape memory case is the one most easily exploited for actuation purposes of interest for the present invention, while one-way shape memory is required for controlled, one-time deployment events, such as expansion of slender medical device or unfolding of a complex structure. In the present application, one-way and two-way shape memory are referred to as 1W-SM and 2W-SM, respectively. However, no 2W-SM polymer has been reported to date that would allow ambient (or environmental) stimulus at temperatures in the 20-40° C. range and with amenability for integration with fabric.

BRIEF SUMMARY OF THE INVENTION

In accordance with the foregoing objects and advantages, the present invention provides a polymer having several critical "ingredients" to achieve reversible actuation, namely, crystallizable network chains, crosslinking (physical or covalent), and stress bias. In addition, the present invention involves polymers that can crystallize at a temperature near ambient temperatures and with minimal undercooling (hysteresis). Further, the present invention involves multiple ways to crosslink the constituent polymer chains, recognizing that physical crosslinks offer processing flexibility combined with imperfect memory (reversibility), while covalent crosslinks feature near-perfect memory but with processing demands that may or may not be amenable to apparel manufacturing. Three groups of polymers that may be used for the present invention have been conceived and, within those groups, the primary compositional variables have been identified. While all three approaches may be pursued, some polymers may feature the best combination of synthesis "robustness," processability, and reversible shape memory, the latter including actuation force, actuation strain, cycle fatigue, among others.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
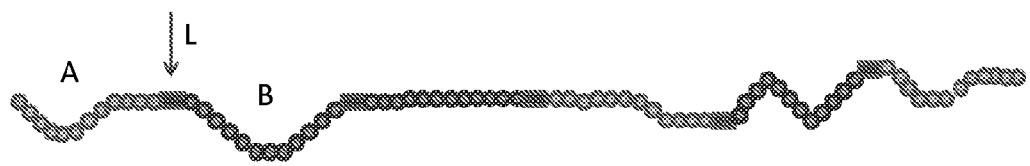
FIG. 1 is a schematic of a multiblock polymer according to the present invention.

Referring now to the drawings, wherein like reference numerals refer to like parts throughout, there is seen in FIG. 1 a schematic a multiblock approach to synthesizing a shape memory polymer according to the present invention. The multiblock polymer of FIG. 1 consists of two (or potentially more) blocks in which the "A" block is the crystalline switching block with relatively low melting transitions, the "B" block with a higher thermal transition (Tg or Tm), and the two are linked together by a linker molecule, "L". This multiblock polymer can be prepared by known polymer chemistry and using commercially available or easily synthesized "A" and "B" blocks. For example, the primary synthetic variables include: the composition and molecular weight of each block, the weight percentage of the "B" block, $w_B$ (noting $w_A+w_B=100\%$), and the total molecular weight of the multiblock polymer. It is recognized that the composition and molecular weight of each block will impact their melting points. This is particularly important for the "A" block since that will regulate the actuation and recovery temperatures, which need to be near ambient temperature. Consequently, both the composition and molecular weight of the "A" block can be varied. Initially, the present invention envisions holding fixed the value of $w_B$ at 30% and the composition of the "B" block such that the Tm value for that block are satisfied. A third block or modification to the linker molecule "L," can be introduced to enable the polymers to be dispersed in a waterborne suspension (or ink) if that process is deemed useful for particular applications.

This multiblock polymer embodiment will yield a shape memory thermoplastic that can be processed by heating to a molten or tacky state and then flowing or bonding the polymers by conventional means. Flow by extrusion, molding, or fiber spinning will be possible only above the second (higher) melting temperature of the multiblock material. The viscosity in that state will be strongly dependent on total polymer molecular weight, as $\eta \sim M^{3.5}$. Tackiness related to a heat transfer process will be highest at a temperature above both thermal transitions of the constituent blocks. Addition of an A block homopolymer to the multiblock polymer in the form of a blend may offer advantages to the heat transfer bonding process. Finally, electrospinning or blown fiber processing is possible with this polymer with little development work required.

This multiblock polymer embodiment will feature two thermal transitions associated stepwise decrease in elastic modulus upon heating. More importantly, reversible actuation should be witnessed when films or fibers of the material are heating (contracting) and cooled (elongating) to melt and recrystallize the "A" block, respectively. Because the "B" block functions as the phase (30% in this design) that physically crosslinks the material, its rigidity relative to the rubbery "A" phase at temperature between the two thermal transitions is of paramount importance. Compared to covalently crosslinked materials, this approach is intrinsically subject to creep (continuous deformation under load) that may slightly compromise the return actuation (return to home position) with each additional cycle. Testing should reveal how much cycle-to-cycle creep actual occurs for different compositions.

The "A" block needs to have a melting transition that is below room temperature, or between room temperature and below approximately 50° C. The molecular weight should be in the range from 2000 g/mol and 100,000 g/mol, preferably between 3500 g/mol and 30,000 g/mol. Compositions for this block can include the following, noting that the molecular weight of each will significantly alter the melting point: poly(ϑ-caprolactone), poly(ethylene oxide), poly(cyclooctene), poly(1,5-cyclooctadiene), poly(cyclooctene-co-cycloctadiene) (random copolymer), poly(trans-butadiene), poly(glycolide), poly(dioxanone), poly(hydroxy butyrate), nylon-6, nylon-4,6, nylon-6,6, nylone-6,10, nylon-11, nylon-12, poly(butene-1), poly(stearyl acrylate), poly(diethyl siloxane), poly(1,3-dioxolane), poly(ethylene imine), poly(hexene-1), poly(trans-1,4-isoprene), poly(4-methyl pentene-1), stereoblock poly(propylene), poly(tetrahydrofuran), poly(trimethylene oxide), and poly(vinyl methyl ether).

The "B" block should be semicrystalline and of similar molecular weight ranges as listed for polymer "A". Thus, it can be selected from the entire list above for block "B", but with the requirement that pair of "A" and "B" feature a higher melting point for the "B" block. The melting point should be higher by at least 10° C., preferably 50° C. higher. The "B" block can also be an amorphous polymer with molecular weight in the range from 2000 g/mol and 100,000 g/mol, preferably between 3500 g/mol and 30,000 g/mol. The glass transition temperature, Tg, should be higher than the Tm of block "A" by at least 10° C., and preferably 50° C. higher. The amorphous block "B" can be selected from this list: poly(styrene), poly(methyl methacrylate), poly (phenylene oxide), poly(carbonate), poly(alkyl methacrylate), poly(alkyl acrylate), polysulfone, poly(acrylonitrile), poly(ether sulfone), polyhedral oligosilsequioxane (POSS) polymers, poly(vinyl acetate), poly(vinyl alcohol), poly(vinyl butyral), poly(vinyl chloride), and poly(N-vinyl carbazole).

The linker "L" can be a direct bond between blocks "A" and "B" in the form of carbon-carbon single, double, and triple blonds, or multi-atom linkages including but not limited to: ether, ester, sulfide, carbonate, urethane, urea, and amide. Molecular linkers may be used as an alternative to direct block-block linkage to link blocks "A" and "B" together and include, diisocyanates, diols, dicarboxylic acids, and dienes.

Figure 2:
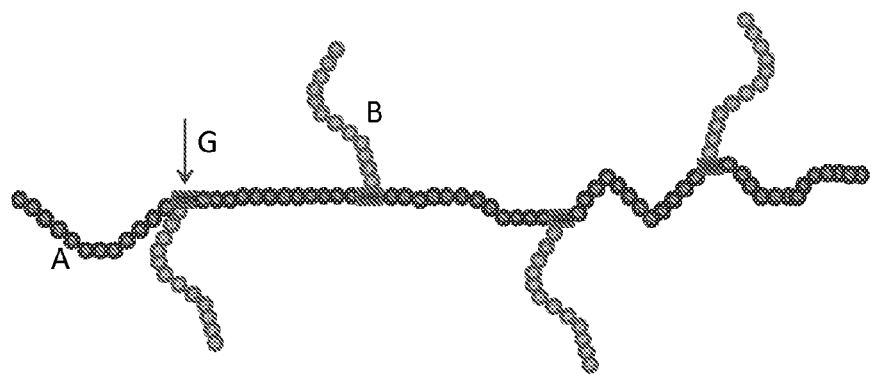
FIG. 2 is a schematic of a graft copolymer according to the present invention

Referring to FIG. 2, the present invention also encompasses a graft copolymer having high and low melting transitions. In this embodiment of the present invention, the graft copolymer has polymer "A" serving as the backbone and polymer "B" being grafted to or from the backbone at the graft locations, "G". As in the first embodiment, the "A" segment is the switching segment, while "B" forms a distinct hard phase that physically crosslinks the material. The graft copolymer approach of the present invention uses a distinct architecture that places the higher thermal transition macromer groups on the backbone of the crystallizable polymer in the form of a graft (or "comb") copolymer. Such polymers can be made using three approaches: (i) a grafting from, (ii) grafting to, or (iii) a macromer approach. One of these approaches may be selected after careful consideration of the relative merits of each approach, such as through the use of graft copolymer literature outside of the SMP field. For example, one implementation of this approach is a simple B-A-B triblock copolymer.

In this embodiment, the primary synthetic variables include: the composition of blocks A and B, the backbone molecular weight, the graft molecular weight, and the grafting density. Here, the grafting density is inversely proportional to the molecular weight between grafting sites, which is our directly controllable variable. Further, the combination of grafting density and graft (B) molecular weight will give $w_B$, which will be targeted at 30%, as in the first approach. This approach will yield a shape memory thermoplastic that is amenable to molding, extrusion, and fiber processing. Heat transfer bonding is expected to be good, but possible only by heating above both thermal transitions. The viscosity should be somewhat lower for this polymer compared to the multiblock approach, owing to the architecture that somewhat disfavors entanglements.

This embodiment should feature two thermal transitions and a profound decrease in elastic modulus as the melting transition of the backbone, "A", is exceeded. Above Tm or Tg of the grafted polymer, the materials should transform to a viscoelastic liquid for processing. Thermal cycling about the backbone melting temperature and with applied tensile load will lead to actuation strain that depends on both the load and the grafting density. It is quite unclear which architecture among the first two approaches will feature larger strain and which one will feature larger actuation force; thus, a basic experimental comparison known to those in the art may be employed.

In this embodiment, block "A" needs to have a melting transition that is above room temperature and below approximately 50° C. The molecular weight should be in the range from 2000 g/mol and 100,000 g/mol, preferably between 3500 g/mol and 30,000 g/mol. Compositions for this block can include the following, noting that the molecular weight of each will significantly alter the melting point:

poly(ϑ-caprolactone), poly(ethylene oxide), poly(cyclooctene), poly(1,5-cyclooctadiene), poly(cyclooctene-co-cycloctadiene) (random copolymer), poly(trans-butadiene), poly(glycolide), poly(dioxanone), poly(hydroxy butyrate), nylon-6, nylon-4,6, nylon-6,6, nylone-6,10, nylon-11, nylon-12, poly(butene-1), poly(stearyl acrylate), poly(diethyl siloxane), poly(1,3-dioxolane), poly(ethylene imine), poly(hexene-1), poly(trans-1,4-isoprene), poly(4-methyl pentene-1), stereoblock poly(propylene), poly(tetrahydrofuran), poly(trimethylene oxide), and poly(vinyl methyl ether).

The grafted block "B" should be semicrystalline and of similar molecular weight ranges as listed for polymer "A". Thus, it should be selected from the entire list above for block "B", but with the requirement that pair of "A" and "B" feature a higher melting point for "B". In addition, block "B" can be a polyhedral oligosilsequioxane (POSS) moiety. The melting point should be higher by at least 10° C., preferably 50° C. higher. The "B" block can also be an amorphous polymer with molecular weight in the range from 2000 g/mol and 100,000 g/mol, preferably between 3500 g/mol and 30,000 g/mol. The glass transition temperature, Tg, should be higher than the Tm of block "A" by at least 10° C., preferably 50° C. higher. The amorphous block "B" can be selected from this list: poly(styrene), poly(methyl methacrylate), poly(phenylene oxide), poly(carbonate), poly(alkyl methacrylate), poly(alkyl acrylate), polysulfone, poly(acrylonitrile), poly(ether sulfone), polyhedral oligosilsequioxane (POSS) polymers, poly(vinyl acetate), poly(vinyl alcohol), poly(vinyl butyral), poly(vinyl chloride), and poly(N-vinyl carbazole).

The grafting point "G" can be a direct bond between backbone block "A" and grafting block "B" in the form of carbon-carbon single, double, and triple blonds, or multi-atom linkages including but not limited to: ether, ester, sulfide, carbonate, urethane, urea, and amide. Molecular linkers may be used as an alternative to direct block-block linkage to graft block "B" to block "A" and include triisocyanates, triols, tricarboxylic acids, and trienes.

Figure 3:
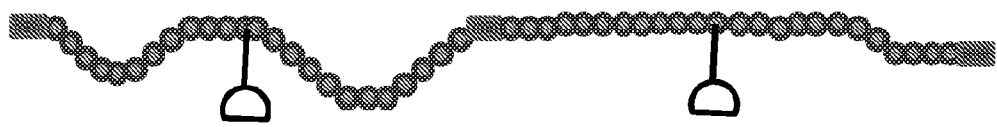
FIG. 3 is a schematic of a semicrystalline polymer with latent crosslinking of reactive groups according to the present invention.

Referring to FIG. 3, the present invention also encompasses latent crosslinking of a semicrystalline polymer with reactive groups (black pendant stickers) placed on the backbone. This crosslinkable group can be chosen from among a variety of crosslinking strategies documented in the literature. In this embodiment, the primary synthetic variables include: the composition of blocks A, the backbone molecular weight, and concentration of crosslinkable groups. Further, the composition of the crosslinker itself is a variable. There are several semicrystalline polymers that are intrinsically crosslinkable and they will be considered carefully as candidates, given the associated synthetic simplicity. Additives (such as peroxides or other) may be required for crosslinking.

In this embodiment, the "backbone" block needs to have a melting transition that is above room temperature and below approximately 50° C. The molecular weight should be in the range from 2000 g/mol and 100,000 g/mol, preferably between 3500 g/mol and 30,000 g/mol. Compositions for this block can include the following, noting that the molecular weight of each will significantly alter the melting point: poly(ϑ-caprolactone), poly(ethylene oxide), poly(cyclooctene), poly(1,5-cyclooctadiene), poly(cyclooctene-co-cycloctadiene) (random copolymer), poly(trans-butadiene), poly(glycolide), poly(dioxanone), poly(hydroxy butyrate), nylon-6, nylon-4,6, nylon-6,6, nylon-6,10, nylon-11, nylon-12, poly(butene-1), poly(stearyl acrylate), poly(diethyl siloxane), poly(1,3-dioxolane), poly(ethylene imine), poly(hexene-1), poly(trans-1,4-isoprene), poly(4-methyl pentene-1), stereoblock poly(propylene), poly(tetrahydrofuran), poly(trimethylene oxide), and poly(vinyl methyl ether).

The backbone of this approach can be crosslinked to adjacent polymeric backbone through carbon-carbon single, double, and triple blonds, or multi-atom linkages including but not limited to: ether, ester, sulfide, carbonate, urethane, urea, and amide Molecular linkers may be used as an alternative to direct backbone-backbone linkage include diisocyanates, diols, dicarboxylic acids, and dienes.

Polymers in this embodiment will require a two-step process: first forming the primary shape by a thermal process and then a second step for setting the permanent shape. This second step will either be a thermal annealing or irradiation from UV light, electron beam, or gamma radiation. It is during this crosslinking that covalent bonds between chains are established, imparting upon the polymer excellent shape memory.

This polymer is expected to feature the best shape memory and actuation characteristics at the expense of a more complicated process, namely the two-step mold, then crosslink processing. The resulting materials are expected to feature reversible melting/crystallization phase behavior with a melting transition that is manipulated by both the polymer backbone composition and the crosslink density.

Shape memory polymers according to the present invention may have their molecular and basic physical properties characterized and evaluated using the following tests. First, GPC will be used to measure the molecular weights (Mn and Mw) of the polymers synthesized. As Mw is strongly correlated with strength and durability of a polymer, while also increasing viscosity, we will seek to optimize the molecular weight of polymers synthesized in an iterative manner involving the sequence: synthesis, GPC characterization, synthesis repetition, etc. Second, Fourier-Transform Infrared Characterization (FT-IR) and $^1$H NMR may be used to measure the relative incorporation levels of different molecular and macromolecular component into the polymers. Because reactivities are not all the same among regents utilized, it is likely that the incorporation levels will be different than those targeted and thus utilized in the polymerization reactions. Third, differential scanning calorimetry (DSC) may be used to measure the melting transitions and glass transitions of the synthesized polymers, adjusting composition as needed to fine tune the melting and crystallization temperatures of the switching phase. Crystallization kinetics will be estimated from the hysteresis in Tc vs. Tm (lower hysteresis indicating faster crystallization). Fourth, x-ray diffraction analysis may be used to measure the degree of crystallinity for crystalline phases within each material using wide-angle x-ray diffraction and associated standard methods. X-ray diffraction will be helpful in comparing degrees of crystallinity, degrees of orientation, and crystallization kinetics (complementing DSC) for those samples that are strong candidates for selection for advanced studies but for which there exists a need to fine-tune crystallization behavior. Fifth, dynamic mechanical analysis (DMA) may be used to gather tensile storage modulus and loss tangent data that will reveal the sharpness of the switching segment's thermal transition, along with the flatness and magnitude of the elastic rubbery plateau between the two thermal transitions. Tensile creep may also be measured in this temperature window. All such DMA data will be highly pertinent to the shape memory cycle testing and compositions should only advance to such testing if DMA results look favorable (especially transition sharpness and rubber plateau flatness). Finally, tensile testing may be performed as durability of the polymers is a must and this will be assessed using ultimate tensile testing with the Linkam TST-350 apparatus. Thus, for each composition, it is possible to measure the Young's modulus, yield stress, elongation at break, and engineering toughness. Those materials that combine good reversible actuation with high toughness will be highly ranked from among the candidates for transition to next levels of investigation.

The reversible shape memory characteristics may be characterized using published techniques, see *Macromolecules* 41, pp. 184-192 (2008), hereby incorporated by reference, using a TA Instruments Q800 apparatus to thermally cycle the SMPs of the present invention and measure the resulting actuation strains. Thus, strain versus temperature loops will be produced for a range of compositions selected from prerequisite thermal and DMA testing and with variation in heating and cooling rate (0.5, 1, 2, and 5° C./min) as well as variation in the applied tensile load. Figures-of-merit may be established for such testing and the materials synthesized ranked for their merit. Initial figures-of-merit included actuation strain at a set stress (1 MPa, for example), thermal hysteresis ($\Delta T = T_{contract} - T_{elongate}$), and actuation stress. The latter will be ascertained by the x-axis intercept of actuation strain versus applies stress, revealing the "upper bound" stress where no actuation occurs at all due to the limited capacity of the elastic rubber phase to contract upon heating.

What is claimed is:

1. A shape memory polymer, comprising:
   a plurality of backbones, wherein each backbone is formed from a switching block consisting of a first monoblock polymer having a first melting transition temperature that is above room temperature and below 50 degrees Celsius;
   a transition block consisting of a second polymer having a second melting transition temperature that is at least 10 degrees Celsius higher than the first melting temperature that is grafted to each of said backbones at a plurality of graft locations along said backbones, wherein each of said plurality of backbones are cross-linked to adjacent of said backbones so that said polymer exhibits two-way shape memory.

2. The polymer of claim 1, wherein said switching block is a single polymer selected from the group consisting of poly(ϑ-caprolactone), poly(ethylene oxide), poly(cyclooctene), poly(1,5-cyclooctadiene), poly(cyclooctene-co-cycloctadiene) (random copolymer), poly(trans-butadiene), poly(glycolide), poly(dioxanone), poly(hydroxy butyrate), nylon-6, nylon-4,6, nylon-6,6, nylon-6,10, nylon-11, nylon-12, poly(butene-1), poly(stearyl acrylate), poly(diethyl siloxane), poly(1,3-dioxolane), poly(ethylene imine), poly (hexene-1), poly(trans-1,4-isoprene), poly(4-methyl pentene-1), stereoblock poly(propylene), poly(tetrahydrofuran), poly(trimethylene oxide), and poly(vinyl methyl ether).

3. The polymer of claim 1, wherein said transition block is grafted to said backbone by a linker.

4. The polymer of claim 3, wherein said linker comprises a direct bond between the switching block and the transition block.

5. The polymer of claim 3, wherein said linker comprises a multi-atom linkage selecting from the group consisting of an ether, an ester, a sulfide, a carbonate, a urethane, a urea, and an amide.

6. The polymer of claim 3, wherein the molecular weight average of the switching block is between 2000 g/mol and 100,000 g/mol.

7. The polymer of claim 3, wherein the molecular weight average of the transition block is between 2000 g/mol and 100,000 g/mol.

8. The polymer of claim 3, wherein the molecular weight average of the switching block and the molecular weight average of the transition block are each between 3500 g/mol and 30,000 g/mol.

9. The polymer of claim 3, wherein the second melting transition temperature is greater than the first melting transition temperature by at least 10 degrees Celsius.

10. The polymer of claim 3, wherein the second melting transition temperature is greater than the first melting transition temperature by about 50 degrees Celsius.

11. The polymer of claim 3, wherein said switching block is selected from the group consisting of poly(ϑ-caprolactone), poly(ethylene oxide), poly(cyclooctene), poly(1,5-cyclooctadiene), poly(cyclooctene-co-cycloctadiene) (random copolymer), poly(trans-butadiene), poly(glycolide), poly(dioxanone), poly(hydroxy butyrate), nylon-6, nylon-4,6, nylon-6,6, nylon-6,10, nylon-11, nylon-12, poly(butene-1), poly(stearyl acrylate), poly(diethyl siloxane), poly(1,3-dioxolane), poly(ethylene imine), poly(hexene-1), poly(trans-1,4-isoprene), poly(4-methyl pentene-1), stereoblock poly(propylene), poly(tetrahydrofuran), poly(trimethylene oxide), and poly(vinyl methyl ether), and the transition block is selected from the group consisting of poly(styrene), poly(methyl methacrylate), poly(phenylene oxide), poly (carbonate), poly(alkyl methacrylate), poly(alkyl acrylate), polysulfone, poly(acrylonitrile), poly(ether sulfone), polyhedral oligosilsequioxane (POSS) polymers, poly(vinyl acetate), poly(vinyl alcohol), poly(vinyl butyral), poly(vinyl chloride), and poly(N-vinyl carbazole).

\* \* \* \* \*